United States Patent [19]

Cok

[11] Patent Number: 5,022,085
[45] Date of Patent: Jun. 4, 1991

[54] NEIGHBORHOOD-BASED MERGING OF IMAGE DATA

[75] Inventor: David R. Cok, Rochester, N.Y.

[73] Assignee: Eastman Kodak Company, Rochester, N.Y.

[21] Appl. No.: 529,797

[22] Filed: May 29, 1990

[51] Int. Cl.⁵ .............................................. G06K 9/00
[52] U.S. Cl. ........................................ 382/1; 340/703; 358/181; 358/183; 364/518
[58] Field of Search ................. 364/518, 521; 358/181, 358/183; 340/703, 728; 382/1

[56] References Cited

U.S. PATENT DOCUMENTS

| | | | |
|---|---|---|---|
| 3,941,925 | 3/1976 | Busch et al. | 178/6.8 |
| 3,989,888 | 11/1976 | Busch et al. | 178/6.8 |
| 4,038,668 | 7/1977 | Quarton | 235/151 |
| 4,199,788 | 4/1980 | Tsujimura | 358/183 |
| 4,356,511 | 10/1982 | Tsujimura | 358/181 |
| 4,484,187 | 11/1984 | Brown et al. | 340/703 |
| 4,551,856 | 11/1985 | Victor et al. | 455/183 |
| 4,602,286 | 7/1986 | Kellar et al. | 358/183 |
| 4,679,039 | 7/1987 | Neill et al. | 340/728 |
| 4,764,809 | 8/1988 | Haycock et al. | 358/183 |
| 4,800,511 | 1/1989 | Tanaka | 364/521 |
| 4,811,245 | 3/1989 | Bunker et al. | 364/521 |
| 4,814,884 | 3/1989 | Johnson et al. | 358/183 |
| 4,827,344 | 5/1989 | Astle et al. | 358/183 |

Primary Examiner—Leo H. Boudreau
Attorney, Agent, or Firm—Edward Dugas

[57] ABSTRACT

An imagery data mechanism for controllably merging separate, digitally formatted and arbitrarily shaped images eliminates overlap-edge artifacts by gradually blending a paste image (40) along its border (44) with a base image (30), regardless of the shape of the paste image. The mechanism employs a 'feathering' window (50) containing a plurality of neighboring pixel locations over which the pixel values of the paste image are controllably modified to achieve a tapered blending of the two images. Whether the data value for any pixel within the display is to be modified from a given database value will depend upon whether or not that pixel location is both within the paste image and a prescribed distance to the border (44) of the paste image. If the pixel location is not even part of the image, it is effectively masked, so that not only does no feathering take place, but neither the base image nor the paste image contributes to its data value.

16 Claims, 1 Drawing Sheet

NEIGHBORHOOD-BASED MERGING OF IMAGE DATA

FIELD OF THE INVENTION

The present invention relates in general to imagery data processing systems and is particularly directed to a mechanism for controllably weighting pixel data values within that portion of an overall image into which a 'pasted' region is to be merged, so as to effect a smooth or 'feathered' blending of the pasted region along its border with a base image.

BACKGROUND OF THE INVENTION

In computer-based image composition and editing systems, which store imagery data in digital format, it is common practice to selectively combine plural images by merging or inserting a first image, termed the 'paste' image, into or on top of a second image termed the 'base' image. Because the images are different, along the edge or border between the base image and the pasted image, an undesirable boundary artifact is created. This anomaly is particularly pronounced where the border has an arbitrary shape, due to the quantized format of the image data base and the finite matrix configuration of the display pixels. One possible mechanism for reducing the artifact is to locally blur the edge of the paste image, so as to 'soften' the effect of the image discontinuity. It has been found, however, that such a solution simply produces the obvious—a pasted image with a blurred border.

SUMMARY OF THE INVENTION

In accordance with the present invention, there is provided a mechanism for controllably merging separate, digitally formatted and arbitrarily shaped images in a manner which effectively eliminates the above-mentioned artifact and performs a gradual blending of the overlay, or paste, image along its border with the base image, regardless of the shape of the paste image. To this end, the image processing mechanism of the present invention employs a 'feathering' window, which encompasses a plurality of neighboring pixel locations over which the pixel values of the paste image are controllably modified in a gradual manner to effect a tapered blending of the two images. Whether the data value for any pixel (i,j) within the display is to be modified from a given database value will depend upon whether or not that pixel location is both within the paste image and within a prescribed distance from its border of the base image. If the pixel location is not part of either the base image or the paste image, it is effectively masked, so that not only does no feathering take place, but neither the base image nor the paste image contributes to its data value.

To determine the data value for each respective pixel location (i,j) within the display matrix, a neighborhood of pixels surrounding that pixel location is defined. Within this neighborhood (or window), the number of pixel locations that are part of the base image is counted. Also, within that same window, the number of pixel locations contained within both the base image and the paste image that is to be merged with the base image is counted. The ratio of the paste image count to the base image count determines the value of a 'feathering' coefficient F(i,j) for that pixel location. To what extent 'feathering' will take place will depend upon how close the pixel location is to the edge of the paste image. The degree of 'closeness' is related to the count ratio. The smaller the ratio, the closer the pixel is to the edge of the paste image. The larger, the ratio (meaning considerably more paste image within the window) the farther the pixel location is from the edge of the paste image. Given this feathering coefficient, an imagery data value for that pixel location (i,j) is automatically defined in accordance with a prescribed combination of the weighting coefficient and imagery data values associated with that pixel location for each of the base and paste images regardless of their shape.

In particular, the imagery data value for the pixel location of interest is defined in accordance with the sum of 1- a first product of an imagery data value for the base image and a first expression containing the feathering coefficient and 2- a second product of an imagery data value for the paste image and a second expression containing the feathering coefficient. The first expression is defined in accordance with the ratio of the feathering coefficient to a prescribed transparency coefficient and the second expression is defined in accordance with the difference between the transparency coefficient and the feathering coefficient. The transparency coefficient is presettable between some maximum value (corresponding to a totally transparent image) and zero (corresponding to a full image without 'ghosting').

DETAILED DESCRIPTION

Figure 1:
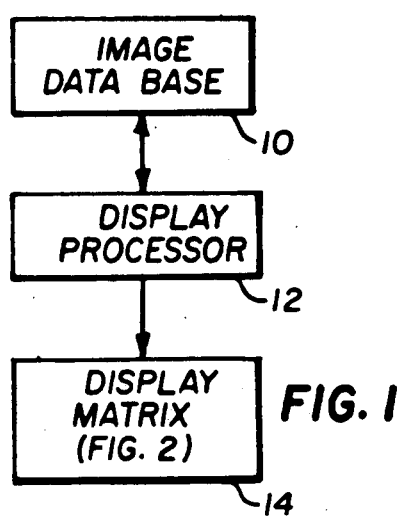
FIG. 1 diagrammatically shows a digital image processing system for merging plural images.

Before describing the details of an embodiment of the present invention, it should be observed that the invention resides primarily in a novel imagery data processing mechanism, rather than a particular implementation of that mechanism. Thus, although, in its preferred embodiment, the invention is implemented using a programmed digital computer, the paste image border feathering mechanism may be carried out by means of a variety of structural combinations of conventional signal processing circuits and components, such as custom-configured integrated circuit hardware. Accordingly, the structure, control and arrangement of the signal processing hardware of an embodiment of the invention have been illustrated in the drawings by a readily understandable block diagram, which shows only those specific details that are pertinent to the present invention, so as not to obscure the disclosure with structural details which will be readily apparent to those skilled in the art having the benefit of the present description.

Referring now to FIG. 1, an imagery data processing system is diagrammatically shown as comprising an imagery data store 10 that contains a plurality of digitally encoded images, portions of or the entireties of which may be selectively accessed by an attendant digital signal processor 12 for display upon an associated display device, such as a high resolution color pixel display unit 14. The images in data store 10 may have been obtained from a color image transducer device, such as a digital RGB video camera, that generates image characteristic-representative digital signals, such as respective red, green and blue channel signal values representative of the red, green and blue color band components of a color object.

Figure 2:
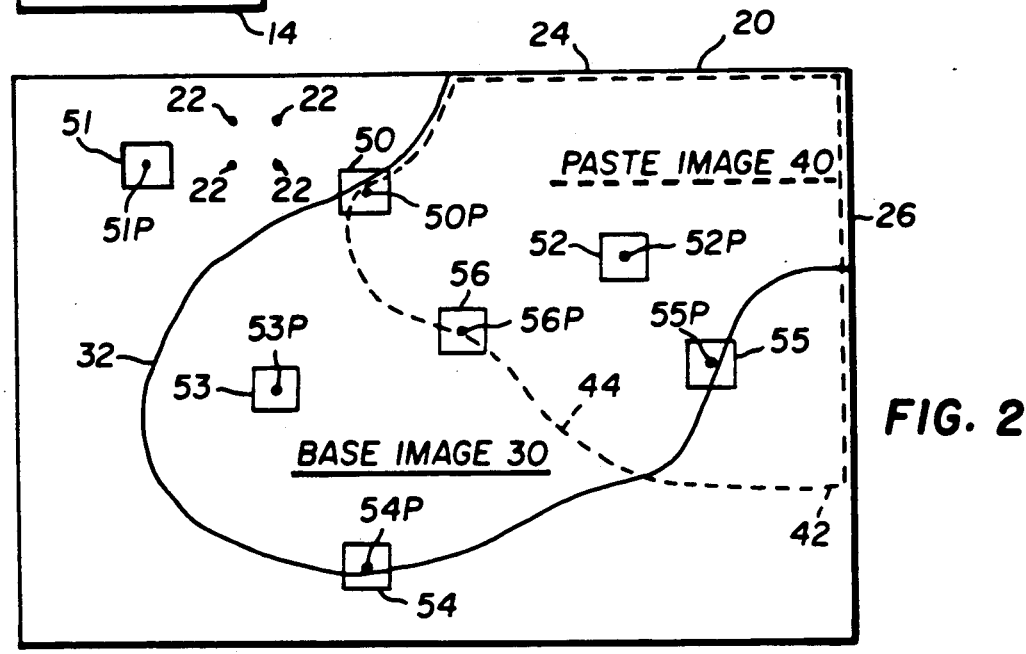
FIG. 2 diagrammatically illustrates an exemplary image matrix containing a base image and an overlayed paste image, the edge of which is to be feather-blended with the base image.

For purposes of providing a simplified illustration of an embodiment of the present invention, the display screen of display unit 14 is depicted in FIG. 2 as containing an array 20 of pixels 22 that are controllably energized in accordance with the imagery data stored in data base 10, in order to display a first, or base, image 30, shown in FIG. 2 as having a solid line border 32, and a second, or paste, image 40, shown as having a broken line border 42. Paste image 40 partially overlaps base image 30 along an overlap edge 44 and, like base image 30, extends to an upper edge 24 and a right-hand edge 26 of matrix 20. Also shown as being distributed throughout the pixel matrix of FIG. 2 are a plurality of arbitrarily located 'feathering' windows 50-56, highlighted within which are respective pixel locations 50p-56p of array 20. As will be described below, the data value used to control the energization of a respective pixel within array 20 is governed by attributes of a neighborhood of pixels surrounding the pixel of interest, the neighborhood location and boundaries of that neighborhood being defined by a 'feathering' window, such as windows 50-56.

More particularly, in order to achieve a gradual blending of the paste image along its edge where it overlaps the base image, the present invention employs a 'feathering' window, which encompasses a plurality of neighboring pixel locations over which the pixel values of the paste image are controllably modified in a gradual manner to effect a tapered blending of the two images. Whether the data value for any pixel (i,j) within the display is to be modified from that supplied by a given database value (e.g. an overlay value) will depend upon whether or not that pixel location is both within the paste image and a prescribed distance from its border with the base image. The prescribed distance is defined by the size of the feathering window and extends over a prescribed plurality W of pixels, the number of which is sufficient to achieve a smooth blending of the base and paste images along the interface between the two. The size of the feathering window may be varied to provide either a gradual blending (for large values of W) or a sharp transition (for small values of W) interface between the paste and base images.

Figure 3:
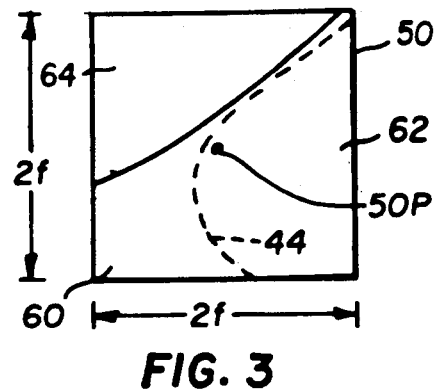
FIG. 3 shows an enlargement of a feathering window 50 in the image matrix of FIG. 2.

FIG. 3 shows an enlargement of feathering window 50 which, for purposes of simplification is shown as having equal vertical and horizontal dimensions of f pixel locations on either side of the pixel 50p of interest, so as to define a square window that surrounds pixel location 50p and encompasses a portion 60 of base image 30, a portion 62 of paste image 40 and a portion 64 of the pixel matrix that lies outside of both the base and paste images, where no image is displayed.

As pointed out above, the size of the feathering window determines the feathering distance, namely within what portion of the paste image pixel data values are to be modified. The feathering distance covers f pixels, so that only those pixels that are within a span of f pixel locations from the border between the paste image and the base image will be modified or 'feathered'. Beyond a distance of f pixels from its edge, the full value of the paste image (absent any ghosting) is employed. Because the feathering distance is f pixels, each side of the feathering window extends a distance of 2f+1 pixels to ensure that the window will always encompass the border for any pixel location within feathering distance f from the border.

In the discussion to follow the following definitions associated with an arbitrary pixel location (i,j) of interest will be used.

$B(i,j)$ = the value of the base image at pixel location (i,j).

$MB(i,j)$ = a base image mask value representing whether pixel (i,j) is part of the base image. $MB(i,j)=0$, if the pixel is not part of the base image, namely it is fully off;

$MB(i,j)$ = MASK_ON if the pixel is part of the base image, where MASK_ON is some maximum mask value (e.g. 128).

$P(i,j)$ = the value of the paste image at pixel location (i,j).

$M(i,j)$ = a mask value representative of the amount of ghosting to be used in pasting the paste image P (without feathering). $M(i,j)=0$, when the paste image is transparent or not defined;

$M(i,j)$ = MASK_ON when the paste image is opaque.

Without the feathering mechanism of the present invention, the composite value $C(i,j)$ of the paste and base images may be conventionally defined as:

$$C(i,j) = (P(i,j)*M(i,j) + B(i,j)*(MASK\_ON - M(i,j))/MASK\_ON.$$

In order to calculate the feathering coefficient associated with a respective pixel location (i,j), each of the pixel locations within the feathering window is examined. If a respective pixel is part of the original base image, an associated base image count NB is incremented. This base image count NB may be defined as:

$NB(i,j)$ = number of pixels $MB(i+k, j+h)$ which are non-zero for $k = -f \ldots +f$, $h = -f \ldots +f$.

If the pixel is within a portion of the paste image which overlaps the base image, an associated count NP is incremented. The count NP may be defined as:

$NP(i,j)$ = number of pixels where $M(i+k, j+h)$ and $MB(i+k, j+h)$ are non-zero for $k = -f \ldots +f$, $h = -f \ldots +f$.

The ratio of the paste image count NP to the base image count NB indicates where the pixel lies and how close to the border between the base and paste images it is located. The lower the ratio, the lesser the paste image contribution to the total image content of the window. The higher the ratio, the greater the paste image content, and the greater its weighting as a paste image. If the pixel of interest lies on the border between the paste and base images, then it can be inferred that there are approximately the same number of pixel locations within the feathering window that lie only in the base image as those that lie in an overlapping paste image. Since the feathering modification of a paste pixel value begins or is lowest at the border of the paste image with the base image, e.g. along edge 44 between base image 30 and paste image 40 in FIG. 2, the contribution of the paste value at any such pixel location is smallest (zero).

Figure 4:
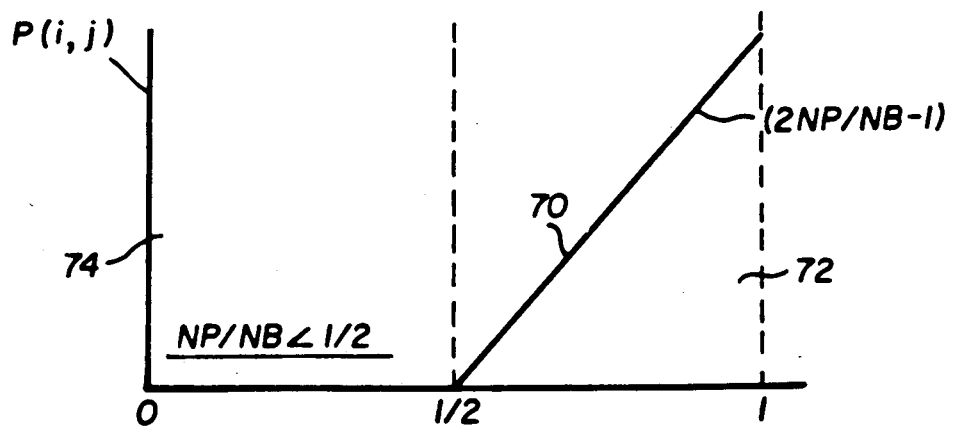
FIG. 4 shows a graphical relationship between feathering coefficient and paste, base image pixel count ratio.

These count ratio relationships are graphically represented in FIG. 4 as a linear feathering characteristic 70, which varies from a minimum value (zero) for an NP/NB value of ½ (the border or edge 44 between the base and paste images) to a value of P(i,j) where NP/NB equals its maximum value of one (indicating that none of the pixels within the feathering window lies within only the base image).

Using the relationship depicted in FIG. 4, and the definitions set forth above, a feathering coefficient F(i,j) may be defined as:

$$F(i,j) = M(i,j)*(2*NP(i,j)/NB(i,j)-1)$$

if $2*NP(i,j) > NB(i,j)$, corresponding to region 72 in FIG. 4, and 0 otherwise, corresponding to region 74 in FIG. 4.

Using feathering coefficient F(i,j), a 'combined' imagery data value C(i,j) for a respective pixel location (i,j) within the pixel array is defined in accordance with a prescribed combination of the feathering coefficient and imagery data values associated with that pixel location for each of the base and paste images.

The combined imagery data value C(i,j) is defined as:

$$C(i,j) = (B(i,j)*(MASK\_ON - F(i,j)) + P(i,j)*F(i,j))/MASK\_ON.$$

An examination of the interior of feathering window 50, shown in enlarged detail in FIG. 3, reveals that each of regions 60 and 64 occupies about one-fourth of the window, while about half the pixel locations encompassed by the window lie within region 62 (the paste image). Consequently, the pixel count ratio of region 62 to the sum of regions 60 and 62 is about ⅔ (which is greater than the threshold value of ½) and pixel 50p will be 'feathered' in accordance with the intersection of the ratio (2/3) with characteristic line 70 of FIG. 4.

For most of the other windows 51–56 that have been illustrated in FIG. 2, there is no feathering of their respective highlighted pixel locations. For example, the entirety of window 52 is located inside paste image 40. Therefore, NP/NB = 1 and F(52p) = MASK_ON (if there is no ghosting). The composite data value of pixel 52p is:

$$C(52p) = (B(52p)*((MASK\_ON - MAS\\K\_ON) = 0) + P(52p)*(MASK\_ON))/MAS\\K\_ON, \text{ i.e. } P(52p).$$

Similarly, the entirety of window 53 is located inside base image 30. Thus, NP/NB = 0 and F(53p) = 0. Accordingly, the data value of its highlighted pixel 53p is:

$$C(53p) = (B(53p)*(MAS\\K\_ON - (F(53p) = 0)) + (P(53p)*F(53p))/MAS\\K\_ON, \text{ i.e. } B(53p).$$

For feathering window 54, which partially overlaps base image region 30 and no image, NP/NB = 0 and F(54p) = 0. Thus, the data value of pixel p54, which lies within the base image region 30, is:

$$C(54p) = (B(54p)*(MAS\\K\_ON - (F(54p) = 0)) + (P(54p)*F(54p) = 0))/MASK\_ON, \text{ i.e. } B(54p).$$

Likewise, for feathering window 55, which partially overlaps paste image region 40 and no image, NP/NB = 1 and F(i,j) = MASK_ON (absent ghosting), so that the data value of pixel 55p, which lies within the paste image region 40, is:

$$C(55p) = ((B(55p) = 0))*((MASK\_ON - MAS\\K\_ON) = 0) + P(55p)*MASK\_ON/MASK\_ON),$$
i.e. $P(55p)$.

Finally, for window 56, which overlaps base image 30 and paste image 40, NP/NB is some value between 0 and 1 and the data value of pixel 56p, which falls within paste region 40, is therefore feathered:

$$C(56p) = (B(56p)*(MAS\\K\_ON - F(56p)) + P(56p)*F(56p))/MASK\_ON.$$

As will be appreciated from the foregoing description, the present invention provides a mechanism for controllably merging separate, digitally formatted images in a manner which effectively eliminates overlap-boundary artifacts and achieves a gradual blending of the overlay, or paste, image along its border with the base image, regardless of the shape of the paste image. The effect of the feathering operation is reduced (to zero) as one approaches the border between the paste image and the base image from the paste image side and is maintained at the zero value along the border. By use of the transparency mask M, the combining operation is applicable to non-binary imaging masks which effect some degree of transparency when merging images, and the amount of feathering may be varied by adjusting the size of the feathering window.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with an imagery data base in accordance with which an array of pixels of an image display device is controllably energized to display an image, a method of controllably combining first imagery data, associated with a first, overlap image, with second imagery data, associated with a second, base image, so as to effect a smooth blending of said first image along its border with said second image comprising the steps of:

(a) for a respective pixel location (i,j) of said array, defining a window that encompasses a plurality W of pixel locations surrounding said pixel location (i,j);

(b) in response to said respective pixel location (i,j) being contained within said first image, defining a first weighting value F(i,j) in accordance with the ratio of the number NP of pixel locations in said window that are contained within both said first and second images to the number NB of pixel locations in said window that are contained within said second image; and (c) defining an imagery data value associated with said pixel location (i,j) in accordance with a prescribed combination of said first weighting value and imagery data values contained within said first and second imagery data for said pixel location (i,j).

2. A method according to claim 1, wherein step (b) comprises defining said first weighting value F(i,j) in accordance with a prescribed combination of said ratio and a second weighting value M(i,j) representative of a prescribed degree of transparency.

3. A method according to claim 2, wherein step (b) comprises defining said first weighting value F(i,j) in accordance with a product of said ratio and said second weighting value.

4. A method according to claim 2, wherein step (b) comprises defining said first weighting value F(i,j) in accordance with a product of said second weighting value and the difference between said ratio and a preselected constant 5. A method according to claim 1, wherein step (b) further comprises setting said first weighting value F(i,j) equal to zero, in response to said respective pixel location (i,j) being contained within said second image, but outside said first image.

6. A method according to claim 1, wherein step (c) comprises defining an imagery data value associated with said pixel location (i,j) in accordance with the sum of a first product of a first imagery data value and a first expression containing said first weighting value and a second product of a second imagery data value and a second expression containing said first weighting value.

7. A method according to claim 6, wherein said first expression is defined in accordance with the ratio of said first weighting value to a mask value representative whether or not said pixel is part of the base image and said second expression is defined in accordance with the difference between said mask value and said first weighting value.

8. For use with an imagery data base in accordance with which an array of pixels of an image display device is controllably energized to display an image, a method of controllably combining first imagery data associated with a first, overlap image with second imagery data associated with a second, base image, so as to effect a smooth blending of said first image along its border with said second image comprising the steps of:
 (a) for a respective pixel location (i,j) of said array, defining a window that encompasses a plurality W of pixel locations surrounding said pixel location (i,j);
 (b) for the window defined in step (a), determining the ratio of the number NP of pixel locations that are contained within said first image to the number NB of pixel locations that are contained within second image;
 (c) determining whether or not said respective pixel location is contained within said first image;
 (d) in response to said respective pixel location (i,j) being contained within said first image, defining a first weighting value F(i,j) in accordance with the ratio determined in step (b); and
 (e) defining an imagery data value associated with said pixel location (i,j) in accordance with a prescribed combination of said first weighting value and imagery data values contained within said first and second imagery data for said pixel location (i,j).

9. A method according to claim 8, wherein step (c) comprises comparing the ratio determined in step (b) to a prescribed value and identifying said respective pixel location as being contained within said first image in response to said ratio exceeding said prescribed value.

10. A method according to claim 9, wherein said prescribed value is one-half.

11. A method according to claim 8, wherein step (d) comprises defining said first weighting value F(i,j) in accordance with a prescribed combination of said ratio and a second weighting value M(i,j) representative of a prescribed degree of transparency.

12. A method according to claim 11, wherein step (d) comprises defining said first weighting value F(i,j) in accordance with a product of said ratio and said second weighting value.

13. A method according to claim 8, wherein step (d) comprises defining said first weighting value F(i,j) in accordance with a product of said second weighting value and the difference between said ratio and a preselected constant.

14. A method according to claim 8, wherein step (d) further comprises setting first weighting value F(i,j) equal to zero, in response to step (c) determining said respective pixel location (i,j) to be contained within said second image, but outside said first image.

15. A method according to claim 8, wherein step (e) comprises defining an imagery data value associated with said pixel location (i,j) in accordance with the sum of a first product of a first imagery data value and a first expression containing said first weighting value and a second product of a second imagery data value and a second expression containing said first weighting value.

16. A method according to claim 15, wherein said first expression is defined in accordance with the ratio of said first weighting value to a mask value representative whether or not said pixel is part of the base image and said second expression is defined in accordance with the difference between said mask value and said first weighting value.

* * * * *